Oct. 20, 1931.    W. H. SAUNDERS    1,828,075
APPARATUS FOR CALKING PIPE
Filed May 5, 1928
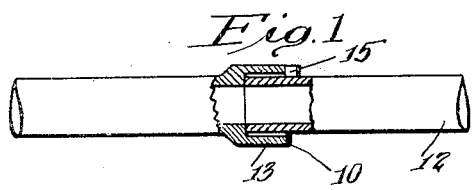
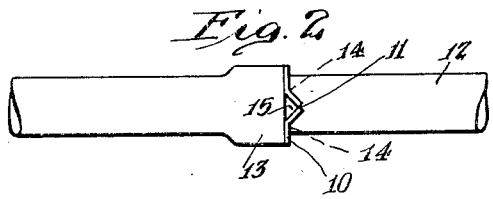
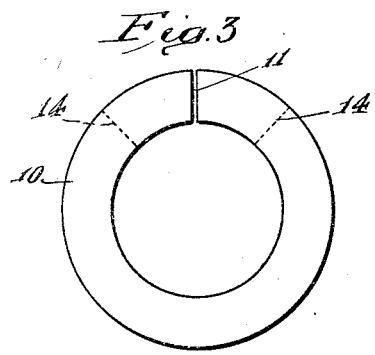
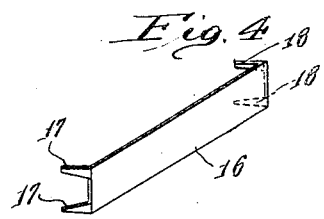
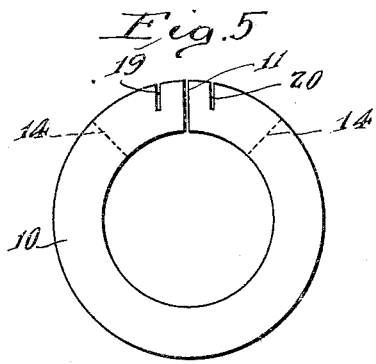
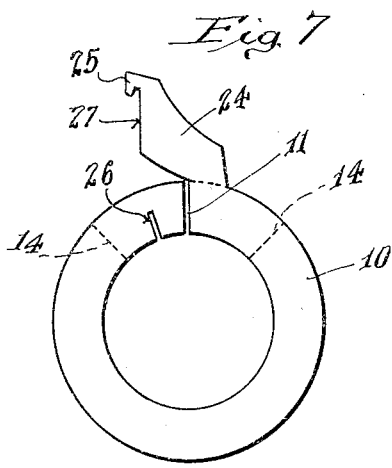
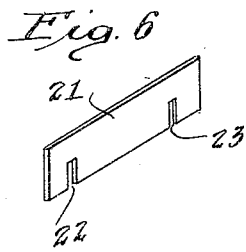
Inventor
W. Hurford Saunders
By Lyon & Lyon
Attorneys Patented Oct. 20, 1931

1,828,075

UNITED STATES PATENT OFFICE

WILLIAM HURFORD SAUNDERS, OF LOS ANGELES, CALIFORNIA, ASSIGNOR TO PACIFIC CLAY PRODUCTS, OF LOS ANGELES, CALIFORNIA, A CORPORATION OF CALIFORNIA

APPARATUS FOR CALKING PIPE

Application filed May 5, 1928. Serial No. 275,539.

This invention relates to calking, joining or cementing sections of pipe together in a simple and efficient manner. The invention also relates to a device adapted to be used in joining or cementing sections of pipe, particularly bell and spigot pipe. The invention particularly relates to a method and to a device adapted to retain cement, asphalt, tar or other plastic or fluid materials in the joint of adjoining pipe sections during the cementing, calking or joining operations.

Various kinds of pipe are made with what are generally known as "bell" ends, the opposite end of pipe sections of this character being provided with plain or spigot ends. This enables the spigot end of the pipe to be placed into the bell end of an adjoining or continuing pipe section, the bell acting as a stuffing box into which a cement, asphalt, tar, or other joining material may be placed or poured. Since most pipes are laid in a substantially horizontal position, some difficulty is experienced in retaining the plastic or fluid cementing material in the joint during the setting or solidifying of the cementing material. Various methods and devices have been invented hitherto to center the spigot within the bell and retain the cementing material within the joint, temporarily or permanently, but these are not applicable to the smaller sizes of pipe (most commonly used) because of the intricacy and multiplicity of parts.

An object of this invention is to provide a simple and effective method of joining bell and spigot pipe sections.

Another object is to disclose a method of retaining cementing material within the joints formed between adjoining bell and spigot pipe sections. Another object is to provide a device for retaining cementing material within pipe joints. Another object is to provide a simple and effective device for enabling cementing material to be easily placed in joints between adjacent pipe sections. Another object is to provide a device adapted to be easily placed upon pipe and retain cementing material within the bell joints. Another object is to provide a unitary, simple, and effective device for substantially closing the annular aperture between the plain and bell ends of adjoining pipe sections. These and other objects, advantages and results attained by the use of my invention will be more clearly understood by the following detailed description of the method claimed herein and of the device embraced by this invention. In the drawings appended hereto several forms and modifications of the device are shown and it is to be understood that the invention is not limited to the specific construction and arrangement of parts shown, but numerous changes and modifications may be made in these devices without departing from the spirit or scope of the invention.

In the drawings:

Figure 1 is a side elevation partly in section of two sections of bell and spigot pipe placed together in interfitting relation and provided with a device for retaining the cementing material within the joint.

Figure 2 is a plan view of the two sections of pipe shown in Figure 1.

Figure 3 is an elevation of one form of device embraced by this invention.

Figure 4 is an isometric drawing of a fastening device which may be used in connection with the device shown in Figure 3.

Figure 5 is a side elevation of a modified form of device.

Figure 6 is an isometric drawing of a separate fastening element to be used with the device shown in Figure 5.

Figure 7 is a side elevation of a still further modification of my device.

The simplest embodiment of my invention comprises a ring of paper, chip board or other self-supporting material capable of being bent or deformed by hand, said ring being cut or slit at one place on its periphery. The slit may be radial or tangential. The inner diameter of the ring may be substantially the same as the outer diameter of the pipe at the spigot end thereof; the outer diameter of the ring may be substantially the same as the outer diameter of the bell of the pipe. A ring of this character is shown in Fig. 3 and comprises an annular ring 10 having a slit 11 therein. The method of using this ring in accordance with my invention comprises placing the ring 10 around the spigot end 12 of the pipe shown in Figs. 1 and 2, then placing the spigot end of said pipe 12 within the bell 13 of an adjoining pipe, pressing the ring 10 against the bell 13 of the adjoining pipe, positioning the slot 11 upon the upper portion of the pipe 12, and then bending the ends of the ring adjoining the slit 11 outwardly away from the bell 13. The ring 10 may be bent outward along the lines 14.

In view of the fact that the inner diameter of the ring 10 is substantially the same as the outer diameter of the pipe 12 at the spigot end thereof, the ring 10 fits closely about said spigot end and a small opening 15 is left between the bell and the ring at the top portion of the pipe, said opening 15 being formed by bending the free ends of the ring 10 as hereinbefore described. The ends of the ring 10 formed by the cut 11 are slightly separated by bending along the lines 14 and this opening between the ends of the ring may then be closed in any suitable manner. For example, when sewer pipe or vitrified clay pipe are being laid in a ditch the opening between the ends of the ring may be easily closed with a hand-full of semi-plastic clay. The cementing material, such as for example, tar or a hydraulic cement mixture may then be poured into the joint through the opening 15, the ring 10 retaining the cementing material within the aperture formed by the bell 13 and between the inner surface of said bell and the outer surface of the spigot end 12 positioned within the bell.

If desired, the ends of the ring 10 formed by the cut or slot 11 therein, may be connected together by means of a suitable fastening device, one form of which is shown in Fig. 4. This fastening device comprises a thin metallic backing strip 16 having prongs 17 and 18 formed at the ends thereof. When the paper ring 10 is made of paper, of clipped board or the like the prongs 17 and 18 may be embedded in the ring 10, the ring 17 being fastened to one of the ends of the paper ring 10 adjoining the cut 11 and the other prongs 18 being fastened to the other end of the ring. Upon bending the paper ring along the lines 14 the strip 16 of the fastening device will maintain the ends of the ring in position and effectively close the opening between the ends of the ring, thereby retaining the cementing material within the ring and directing its flow into the joint.

It will be understood that the fastening device is preferably made of a flexible material such as for example, tin which can be bent to assume any desired form.

A still further modification of my device is illustrated in Figure 5 in which the ring 10 having a slot 11 therein, is provided with slots or openings 19 and 20 positioned near the slot or cut 11 but extending only partially through the body of the ring 10. The fastening device used with this type of ring may consists of a fibrous or metallic body portion 21 (Figure 6) having a pair of slots 22 and 23 therein, said slots also extending into the body portion 21 for a part of its length. The distance between the slots 22 and 23 should be appreciably greater than the distance between the slots 19 and 20 when the ring 10 is flat and the ends thereof substantially together. When this form of ring is placed upon the spigot end of a pipe and the ends thereof bent outwardly at the lines 14, the fastending device 21 may be placed and operably connected with the ends of the ring by causing the slots 19 and 22 in ring and fastening device to engage each other and overlap the uncut portions of fastening device and ring respectively. The slots 20 and 23 are also engaged in a similar manner so that the ends of the ring are spaced and simultaneously retained in this position.

A still further modification of my invention is illustrated in Fig. 7 and comprises a ring 10 having a slot 11 therein and provided with an arcuate extension 24 operably connected to the outer periphery of the ring at a point closely adjoining the slot 11. The width of the arcuate portion 24 is preferably substantially equal to the width of the ring 10. The length of the arcuate portion may vary depending upon the size of the opening which it is desired to form with the ring when said ring is bent along the lines 14.

The outer end of the arcuate portion 24 is provided with a smaller extension or hooked portion 25. A small slit or cut 26 is made near the other end of the ring, that is, that end of the ring which does not bear the arcuate portion 24.

After placing the ring 10 about the spigot end of the pipe, the arcuate portion 24 may be bent along an extension of the outer diameter of the ring and the hooked portion 25 fastened to the other end of the ring by placing the hooked portion within the aperture 26. The outer edge 27 of the arcuate portion 24 forms a spacing bar which separates the ends of the ring while the hook 25 holds the ends of the rings in stable relation to each other.

Numerous other modifications may be made in the construction of a device of the above described character by means of which the method hereinabove described may be carried out. In all instances a ring made of deformable but self-supporting material is used of such size as to enable it to be slipped over the spigot end of a pipe section and of sufficient width to cover the annular space between the spigot and the bell of an adjoining pipe section. Thin sheet metal, heavy paper or any other suitable material may be used for the ring and any fastening means may be used whether it is integral with the ring or separate therefrom. All of these rings or joining devices should be provided, however, with a slot or cut therein so that the ends of the rings may be bent away from the bell which it is desired to fill with a cementing material, thereby forming an opening through which the cementing material may be poured. In view of the fact that these joining devices may be made of very inexpensive material, such as paper, they need not be removed from the pipe after the joint is made, although they may be removed if this is desired.

I claim:

An apparatus for forming joints in bell and spigot pipes comprising, an annular ring of deformable but self-supporting material having an inner diameter adapted to receive the bell end of the pipe, a substantially radial slit in said ring at one portion of its periphery, an arcuate extension connected to the ring adjoining the slit and a short slit in the ring adapted to engage a portion of the arcuate extension on the other side of the substantially radial slit.

Signed at Los Angeles, California, this 30th day of April, 1928.

W. HURFORD SAUNDERS.